H. Shlarbaum,
Aquarium.
Nº 31,040.   Patented Jan. 1, 1861.
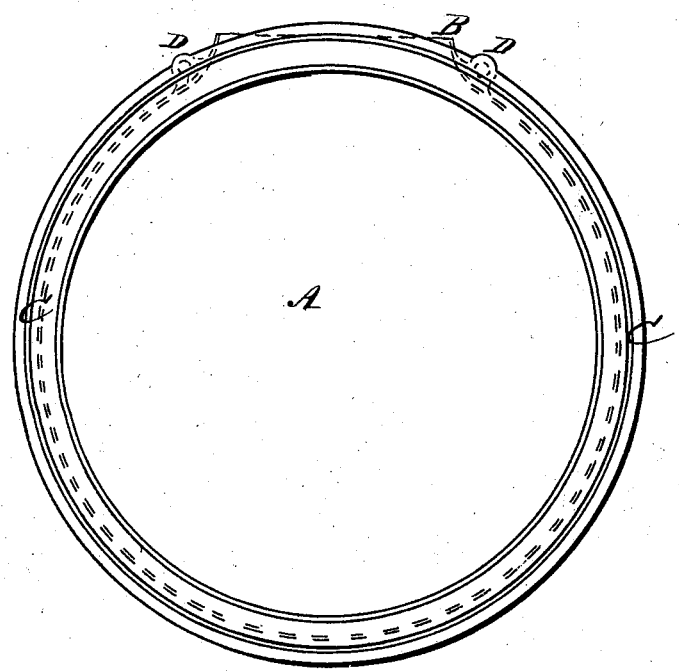
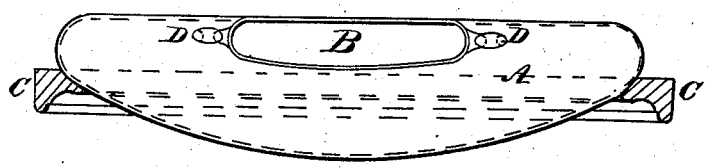
Witnesses  
Henry E. Roeder  
Julian Keeny
Inventor  
Herrmann Shlarbaum

UNITED STATES PATENT OFFICE.

HERRMANN SHLARBAUM, OF NEW YORK, N. Y.

IMPROVEMENT IN AQUARIA.

Specification forming part of Letters Patent No. 31,040, dated January 1, 1861.

*To all whom it may concern:*

Be it known that I, HERRMANN SHLARBAUM, of New York, in the county and State of New York, have invented a new and useful Improvement in Aquaria; and I do hereby declare that the following is a full and exact description thereof, reference being had to the accompanying drawings and to the letters of reference marked thereon.

Figure I represents a front view, and Fig. II a section, of my improved aquarium.

At the present moment aquaria are very expensive, besides being rather clumsy, liable to leaks and accidents, and cannot easily find a place in the parlor, in consequence of which an extra stand or table must be consigned to them, often required for more needful things. These difficulties, small as they seem to be, fully account that this beautiful display of living fishes, as presented in a well-stocked aquarium, is so seldom met with in private houses.

My improvement consists in the arrangement and construction of an aquarium so as to bring the same in precisely the same relation as pictures capable of being suspended on the wall.

In the accompanying drawings, A represents a flat, oval, or round vessel blown of white glass, with a wide mouth or opening, B, for the introduction of the water, animals, &c. This vessel is placed in a suitable frame, C, similar to picture-frames or frames for other ornamentations of parlor-walls. Two eyes, D D, are fastened to the vessel A for suspending the same on the wall, or provision may be made on the frame for this purpose. A glass vessel as here described, made in one piece, will never leak nor cost much. The back, resting against the wall, may be painted plain or ornamented with suitable scenery.

Larger aquaria may be made by having the back and sides of china, earthenware, or even cast-iron, with plate-glass put tight in the front. The depth of these glass vessels requires to be only sufficient to admit the turning round of the animals, and need consequently not project more than eight to nine inches.

The outside shape of my improved aquarium and the style of frame, as well as the manner of ornamenting the same, admit of an endless variety, on which fancy and cost alone must decide.

What I claim as my invention, and desire to secure by Letters Patent, is—

The described construction of an aquarium, arranged so as to be suspended on a wall, in the manner and for the purpose substantially as set forth.

HERRMANN SHLARBAUM.

Witnesses:
HENRY E. ROEDER,
JULIAN KEEN.